(12) United States Patent
Tanaka

(10) Patent No.: US 10,146,485 B1
(45) Date of Patent: Dec. 4, 2018

(54) IMAGE PROCESSING APPARATUS

(71) Applicants: KABUSHIKI KAISHA TOSHIBA, Tokyo (JP); TOSHIBA TEC KABUSHIKI KAISHA, Tokyo (JP)

(72) Inventor: Hiromasa Tanaka, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/703,081

(22) Filed: Sep. 13, 2017

(30) Foreign Application Priority Data

May 31, 2017 (JP) ................... 2017-107420

(51) Int. Cl.
| | | |
|---|---|---|
| *G06F 15/00* | (2006.01) | |
| *G06F 3/12* | (2006.01) | |
| *H04N 1/00* | (2006.01) | |
| *H04N 1/21* | (2006.01) | |

(52) U.S. Cl.
CPC ............ *G06F 3/1208* (2013.01); *G06F 3/125* (2013.01); *H04N 1/00374* (2013.01); *H04N 1/00376* (2013.01); *H04N 1/00803* (2013.01); *H04N 1/21* (2013.01); *H04N 2201/0094* (2013.01); *H04N 2201/3257* (2013.01)

(58) Field of Classification Search
CPC .............. H06F 3/1208; H04N 1/00803; H04N 1/00374; H04N 1/21; H04N 2201/0094; H04N 2201/3256; H04N 1/00376; G06F 3/125

USPC ........................................................ 358/1.18
See application file for complete search history.

(56) References Cited

U.S. PATENT DOCUMENTS

| | | | |
|---|---|---|---|
| 2008/0212132 A1* | 9/2008 | Matsumoto | ........ H04N 1/00374 358/1.15 |
| 2017/0195503 A1* | 7/2017 | Mishima | ................ H04N 1/387 |
| 2017/0339285 A1* | 11/2017 | Sadakuni | ............. G02B 27/017 |
| 2018/0054539 A1 | 2/2018 | Terada et al. | |

FOREIGN PATENT DOCUMENTS

JP    2008-078757 A    4/2008

* cited by examiner

*Primary Examiner* — Saeid Ebrahimi Dehkord
(74) *Attorney, Agent, or Firm* — Foley & Lardner LLP

(57) ABSTRACT

An image processing apparatus includes a reading unit, an acquiring unit, a color information extracting unit, a storage unit, an image extracting unit, and an image generating unit. The reading unit reads an image on a sheet. The acquiring unit acquires image data from the image read by the reading unit. The color information extracting unit extracts color information from the image data. The storage unit stores specific color information. The image extracting unit extracts second image data surrounded by a line with the specific color information in first image data that the acquiring unit acquires from an image on a first sheet which is read by the reading unit. The image generating unit generates third image data based on the second image data.

17 Claims, 21 Drawing Sheets

FIG. 6

| COLOR NUMBER | R | G | B |
|---|---|---|---|
| 1 (GREEN) | 0 | 255 | 0 |
| 2 (PINK) | 220 | 140 | 150 |
| 3 (YELLOW) | 255 | 255 | 0 |
| 4 (BLUE) | 0 | 0 | 255 |
| 5 (NAVY) | 0 | 0 | 100 |

| REGION TYPE | REGION NUMBER | COORDINATES | | REGION SIZE | | COLOR NUMBER | IMAGE DATA |
|---|---|---|---|---|---|---|---|
| I | 1 | xi1 | yi1 | XI1 | YI1 | 4 (BLUE) |  |
| I | 2 | xi2 | yi2 | XI2 | YI2 | 2 (PINK) |  |
| I | 3 | xi3 | yi3 | XI3 | YI3 | 1 (GREEN) |  |
| O | 1 | xo1 | yo1 | XO1 | YO1 | 2 (PINK) | — |
| O | 2 | xo2 | yo2 | XO2 | YO2 | 1 (GREEN) | — |
| O | 3 | xo3 | yo3 | XO3 | YO3 | 3 (YELLOW) | — |

FIG. 19

| REGION TYPE | REGION NUMBER | COORDINATES | | REGION SIZE | | COLOR NUMBER | IMAGE DATA |
|---|---|---|---|---|---|---|---|
| I | 1 | xi1 | yi1 | XI1 | YI1 | 2 (PINK) | ≡ |
| I | 2 | xi2 | yi2 | XI2 | YI2 | 1 (GREEN) | ◔ |
| I | 3 | xi3 | yi3 | XI3 | YI3 | 5 (NAVY) | ≡ |
| O | 1 | xo1 | yo1 | XO1 | YO1 | 2 (PINK) | — |
| O | 2 | xo2 | yo2 | XO2 | YO2 | 1 (GREEN) | — |
| O | 3 | xo3 | yo3 | XO3 | YO3 | 4 (BLUE) | — |

IMAGE PROCESSING APPARATUS

CROSS-REFERENCE TO RELATED APPLICATION

This application is based upon and claims the benefit of priority from Japanese Patent Application No. 2017-107420, filed May 31, 2017, the entire contents of which are incorporated herein by reference.

FIELD

Embodiments described herein relate generally to an image processing apparatus and an image processing method in which an image to be extracted and a synthesis position are specified.

BACKGROUND

In the related art, there is known a technology that surrounds an image on a portion of an original document with a marker and cuts out and extracts the image with an image processing apparatus reading the original document.

At this time, a management symbol (for example, a numeric character) is provided in the vicinity of the marker so that the extracted image is managed while being associated with the management symbol.

However, in the related art, a symbol that is previously formed on the original document may be erroneously recognized as the management symbol.

DESCRIPTION OF THE DRAWINGS

FIG. 6 is a table showing information stored in a color information database (DB) according to the first embodiment.

FIG. 19 is a table showing information stored in a region information holding unit according to the third embodiment.

DETAILED DESCRIPTION

An object of an exemplary embodiment is to provide an image processing apparatus in which an image in a region surrounded by a line with specific color information is extracted from a cut-out original document and a new image is generated from the extracted image based on layout position information associated with the specific color information.

An image processing apparatus according to an embodiment includes a reading unit, an acquiring unit, a color information extracting unit, a storage unit, an image extracting unit, and an image generating unit.

The reading unit reads an image on a sheet. The acquiring unit acquires image data from the image read by the reading unit. The color information extracting unit extracts color information from the image data. The storage unit stores specific color information. The image extracting unit extracts second image data surrounded by a line with the specific color information in first image data that the acquiring unit acquires from an image on a first sheet which is read by the reading unit. The image generating unit generates third image data based on the second image data.

Hereinafter, exemplary embodiments will be described with reference to drawings.

First Embodiment

In a first embodiment, a multifunction peripheral (MFP) that has a function of forming a toner image on a sheet will be described as an example of an image processing apparatus 1.

Figure 1:
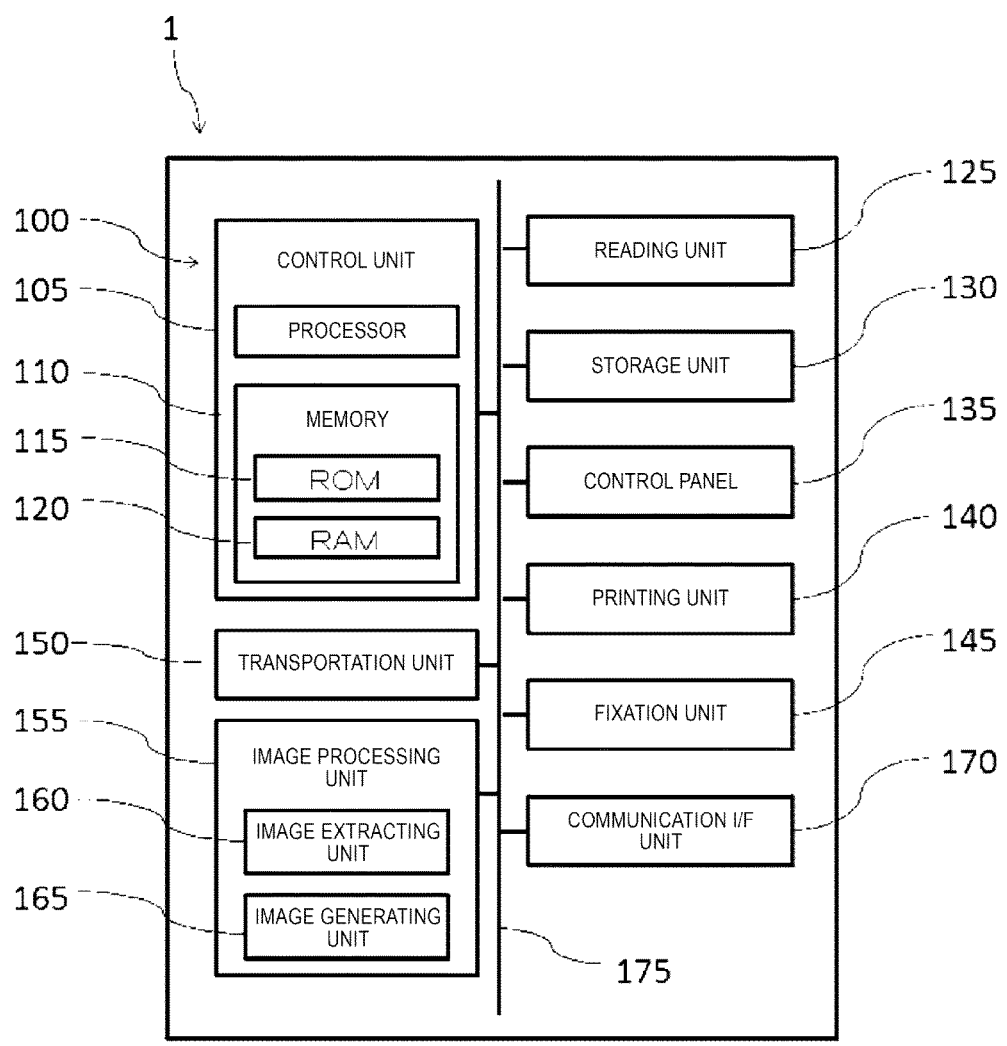
FIG. 1 is a block diagram illustrating a configuration of an image processing apparatus according to a first embodiment.

FIG. 1 is a block diagram illustrating a configuration of the image processing apparatus 1. The image processing apparatus 1 includes a control unit 100, a reading unit 125, a storage unit 130, a control panel 135, a printing unit 140, a fixation unit 145, a transportation unit 150, an image processing unit 155 and a communication interface (I/F) unit 170. Components in the image processing apparatus 1 are connected to each other via a bus 175.

The control unit 100 includes a processor 105 configured of a central processing unit (CPU) or a micro processing unit (MPU) and a memory 110. The memory 110 is, for example, a semiconductor memory and includes a read only memory (ROM) 115 that stores various control programs and a random access memory (RAM) 120 that provides a temporal work area for the processor 105. The control unit 100 controls each component in the image processing apparatus 1 based on various programs stored in the ROM 115.

The reading unit 125 is, for example, a scanner that reads an image on a sheet that is a target. Image information read by the reading unit 125 is stored in the storage unit 130, which will be described later, as image data. The image data stored in the storage unit 130 may be transmitted to another information processing apparatus via a network. In addition, the image data stored in the storage unit 130 may be formed as an image on another sheet by the printing unit 140, which will be described later.

The storage unit 130 stores image data read by the reading unit 125. The storage unit 130 may be, for example, a hard disk drive, a magnetic storage device other than the hard disk drive, an optical storage device, a semiconductor storage device such as a flash memory, or an arbitrary combination thereof.

The control panel 135 includes a display unit and an operation unit. The display unit is a liquid crystal display, an organic electro luminescence (EL) display, or the like. The display unit displays various information related to the image processing apparatus 1. The operation unit receives a user's operation. The operation unit outputs a signal corresponding to an operation performed by a user to the control unit 100. The display unit and the operation unit may be configured into a single touch panel.

The printing unit 140 forms an image on a front surface of the sheet by using toner. Examples of the toner include yellow toner (Y), magenta toner (M), cyan toner (C), and black toner (K). The printing unit 140 includes a charging unit, a photoconductive drum, a light exposure unit, a developing unit, a transfer roller, and a transfer belt. The charging unit uniformly applies an electric charge to a surface of the photoconductive drum. The light exposure unit irradiates the photoconductive drum with laser light. As a result, an electric charge on a portion of the photoconductive drum which is irradiated with the laser light is lost and an image (an electrostatic latent image) is formed on the photoconductive drum due to static electricity. The toner supplied from a cartridge retaining toner is supplied to the photoconductive drum by the developing unit so that a toner image is formed on the electrostatic latent image. The image is transferred to the transfer belt (primary transfer) and is transferred from the transfer roller to the sheet (secondary transfer).

The fixation unit 145 includes a heating roller and a pressing roller. The heating roller heats a front surface of the sheet. The pressing roller presses a rear surface of the sheet. When an image is formed, the fixation unit 145 fixes the toner image transferred to the sheet by using the heat and pressure.

The transportation unit 150 includes a plurality of transportation rollers which are disposed in a transportation path and a transportation motor that drives the transportation rollers. The transportation unit 150 transports a sheet along the transportation path from a paper feeding tray and discharges the sheet to a paper discharging tray via the printing unit 140 and the fixation unit 145.

The image processing unit 155 includes an image extracting unit 160 and an image generating unit 165. The image processing unit 155 may be configured by using the above-described CPU or MPU. In addition, a portion or all of the functions of the image processing apparatus 1 may be realized by an application specific integrated circuit (ASIC) as the processor 105.

The image extracting unit 160 extracts image data of a specific region which is formed on an original document. The image data of a specific region is, for example, an image in a region surrounded by a line (hereinafter, a hand-drawn line) that is drawn by using a marker pen or a ballpoint pen. The image extracting unit 160 extracts image data in the region and stores the extracted image data, color information of the hand-drawn line surrounding the region, and position information associated with the color information. The image generating unit 165 generates new image data based on one image data piece extracted by the image extracting unit 160 or a plurality of image data pieces extracted by the image extracting unit 160. The configuration thereof will be described later.

The communication I/F unit 170 is an interface that is connected to an external device. The communication I/F unit 170 communicates with an external device on the network through appropriate wireless communication conforming to IEEE 802.15, IEEE 802.11, IEEE 802.3, or the like such as Bluetooth (registered trademark), infrared communication, or optical communication or wired communication. The communication I/F unit 170 may further include a USB connection portion to which a USB connection terminal is connected, a parallel interface, or the like. The control unit 100 communicates with a multifunction peripheral and an external device other than the multifunction peripheral via the communication I/F unit 170.

Figure 2:
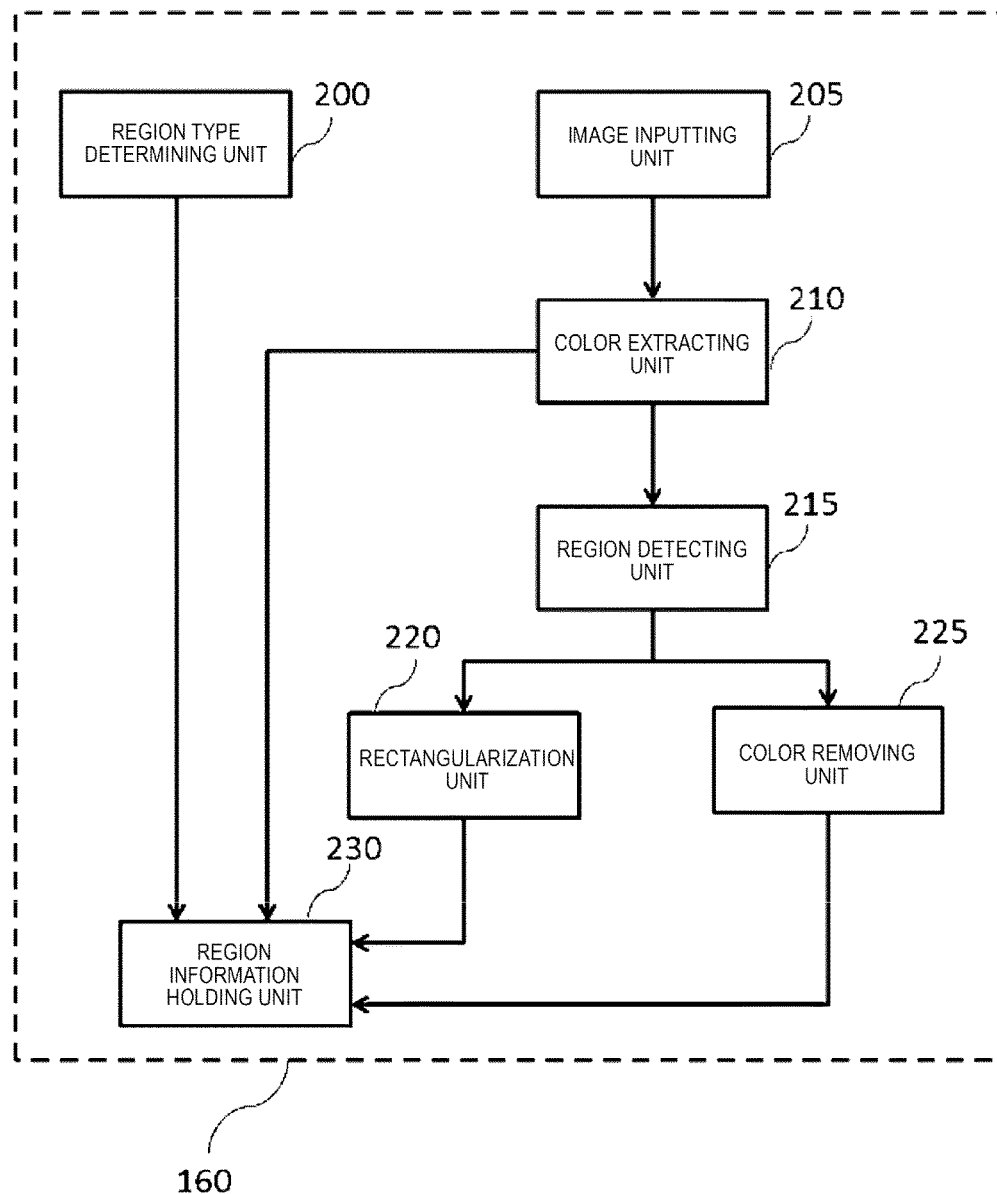
FIG. 2 is a block diagram illustrating a configuration of an image extracting unit according to the first embodiment.

FIG. 2 is a block diagram of the image extracting unit 160 in the image processing apparatus 1 according to the first embodiment. The image extracting unit 160 includes a region type determining unit 200, an image inputting unit 205, a color extracting unit 210, a region detecting unit 215, a rectangularization unit 220, a color removing unit 225, and a region information holding unit 230.

Figure 3A:
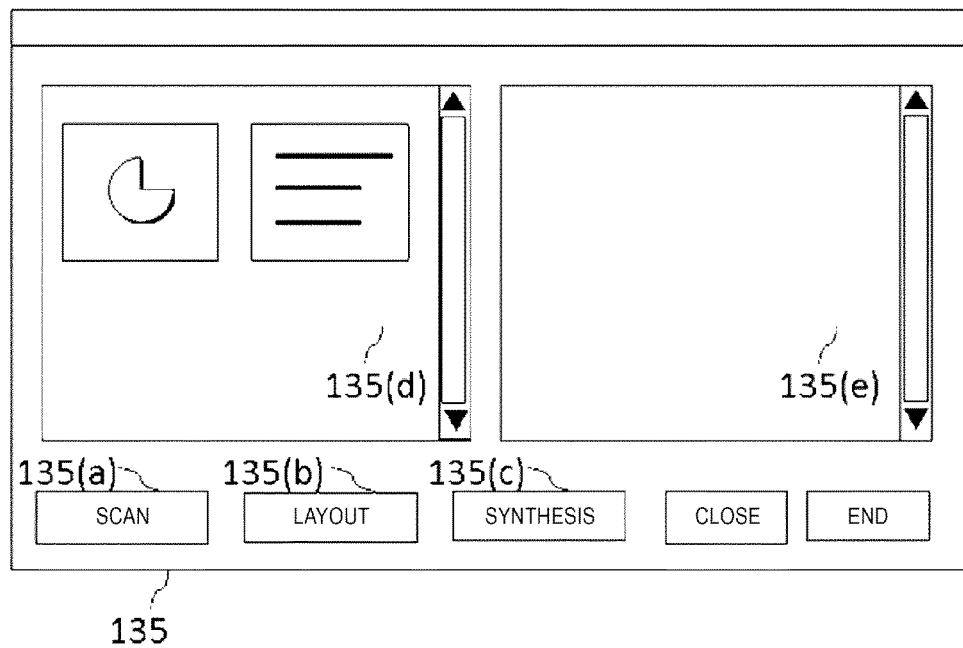
FIGS. 3A and 3B are plane views illustrating a screen displayed on a control panel according to the first embodiment.
Figure 3B:
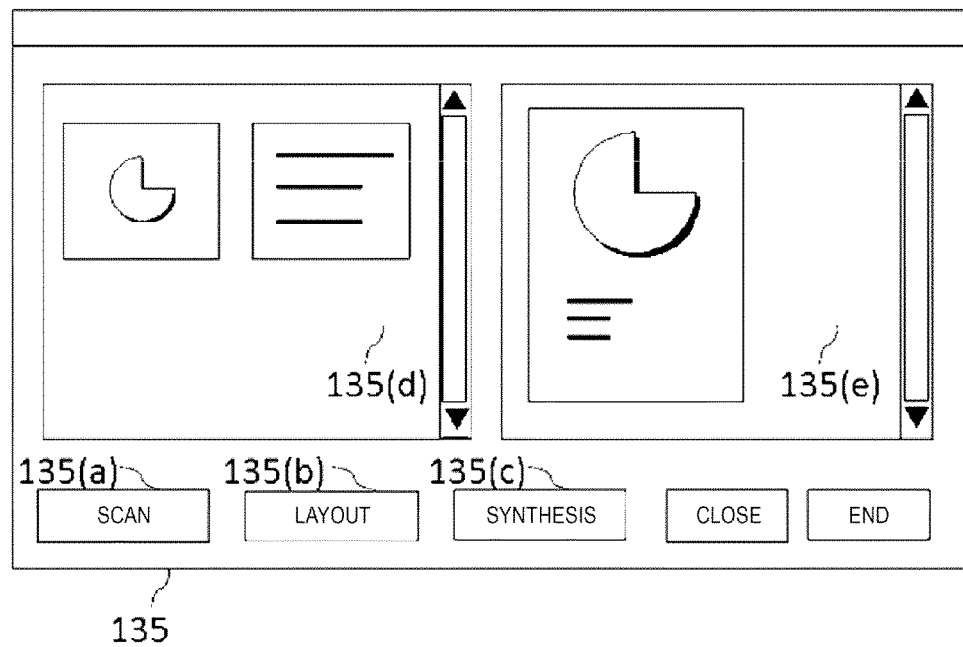

The region type determining unit 200 determines whether an original document to be read by the reading unit 125 is an original document for image data extraction (hereinafter, a cut-out original document 2) or an original document including position information for image data generation (hereinafter, a layout original document 3). For example, as illustrated in FIGS. 3A and 3B, the control panel 135 displays a "scan" button 135 (*a*), a "layout" button 135 (*b*), a "synthesis" button 135 (*c*), an image 135 (*d*), and an image 135 (*e*). The control unit 100 causes the reading unit 125 to read an original document when the "scan" button 135 (*a*) or the "layout" button 135 (*b*) on the control panel 135 is pushed. If the "scan" button 135 (*a*) on the control panel 135 is pushed, the region type determining unit 200 determines that an original document to be read by the reading unit 125 is the cut-out original document 2.

FIG. 3A is a view illustrating the control panel 135 after the reading unit 125 reads the cut-out original document 2. Here, the image 135 (*d*) is image data that the reading unit 125 acquires from the cut-out original document 2. If the "layout" button 135 (*b*) on the control panel 135 is pushed, the region type determining unit 200 determines that the original document to be read is the layout original document 3. It is desirable that the "layout" button 135 (*b*) is displayed with a different color until the reading unit 125 reads the cut-out original document 2 and the control panel 135 does not react even when the "layout" button 135 (*b*) is pushed. In addition, it is desirable that the "synthesis" button 135 (*c*) is displayed with a different color until the reading unit 125 reads the cut-out original document 2 and the layout original document 3 and the control panel 135 does not react even when the "synthesis" button 135 (*c*) is pushed. FIG. 3B is a view illustrating the control panel 135 after the reading unit 125 reads the layout original document 3. Here, new image data that is generated by the image generating unit 165, which will be described later, based on image data acquired from the cut-out original document 2 and image data acquired from the layout original document 3 is displayed as the image 135 (*e*).

Figure 4:
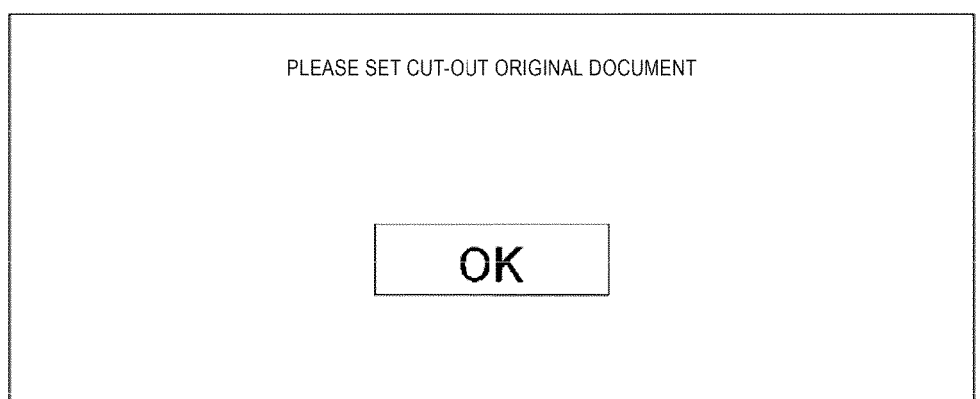
FIG. 4 is a plane view illustrating a notification screen.

As illustrated in FIG. 4, the control unit 100 may cause the control panel 135 to display a message that prompts one to set the cut-out original document 2 in the reading unit 125 when the "scan" button 135 (*a*) is pushed. In addition, the control unit 100 may cause the control panel 135 to display a message that prompts one to set the layout original document 3 in the reading unit 125 when the "layout" button 135 (*b*) is pushed.

The image inputting unit 205 inputs information of image data read by the reading unit 125 to the color extracting unit 210 of the image extracting unit 160. Each unit in the image extracting unit 160 performs a process based on the information input by the image inputting unit 205.

The color extracting unit 210 detects color information formed on each original document. The color extracting unit 210 acquires information values represented by an RGB (which are primary colors) color space as the color information and recognizes a hand-drawn line based on the information values. Note that, specific color information in the first embodiment is acquired from image data that is acquired when the reading unit 125 reads an original document for registration of the specific color information (hereinafter, a color registration original document 4). Color information that the color extracting unit 210 acquires from the color registration original document 4 is stored in a color information database (DB) (not shown) in the storage unit 130 in the form of RGB values. The color information acquired at this time is stored while being given at least one of a color number and a color name. When the color extracting unit 210 detects the specific color information registered in the color information DB from color information acquired from the cut-out original document 2 and the layout original document 3, the color extracting unit 210 stores the color information in the region information holding unit 230.

The region detecting unit 215 determines an area surrounded by the hand-drawn line detected by the color extracting unit 210 as a region. Hereinafter, a region detected on the cut-out original document 2 will be referred to as a cut-out region 250 and a region detected on the layout original document 3 will be referred to as a layout region 260.

The rectangularization unit 220 forms a rectangle including a region detected by the region detecting unit 215. Hereinafter, a rectangle formed on the cut-out original document 2 will be referred as a cut-out rectangle 255 and a rectangle formed on the layout original document 3 will be referred as a layout rectangle 265.

When the cut-out original document 2 is read, the color removing unit 225 removes the hand-drawn line from image data in the cut-out region 250 detected by the region detecting unit 215 and stores image data, which is acquired after removing the hand-drawn line, in the region information holding unit 230.

In the region information holding unit 230, information acquired by using the region type determining unit 200, the rectangularization unit 220, and the color removing unit 225 is stored while being associated with each region. In addition, the specific color information acquired by the color extracting unit 210 is also stored in the region information holding unit 230.

Figure 5:
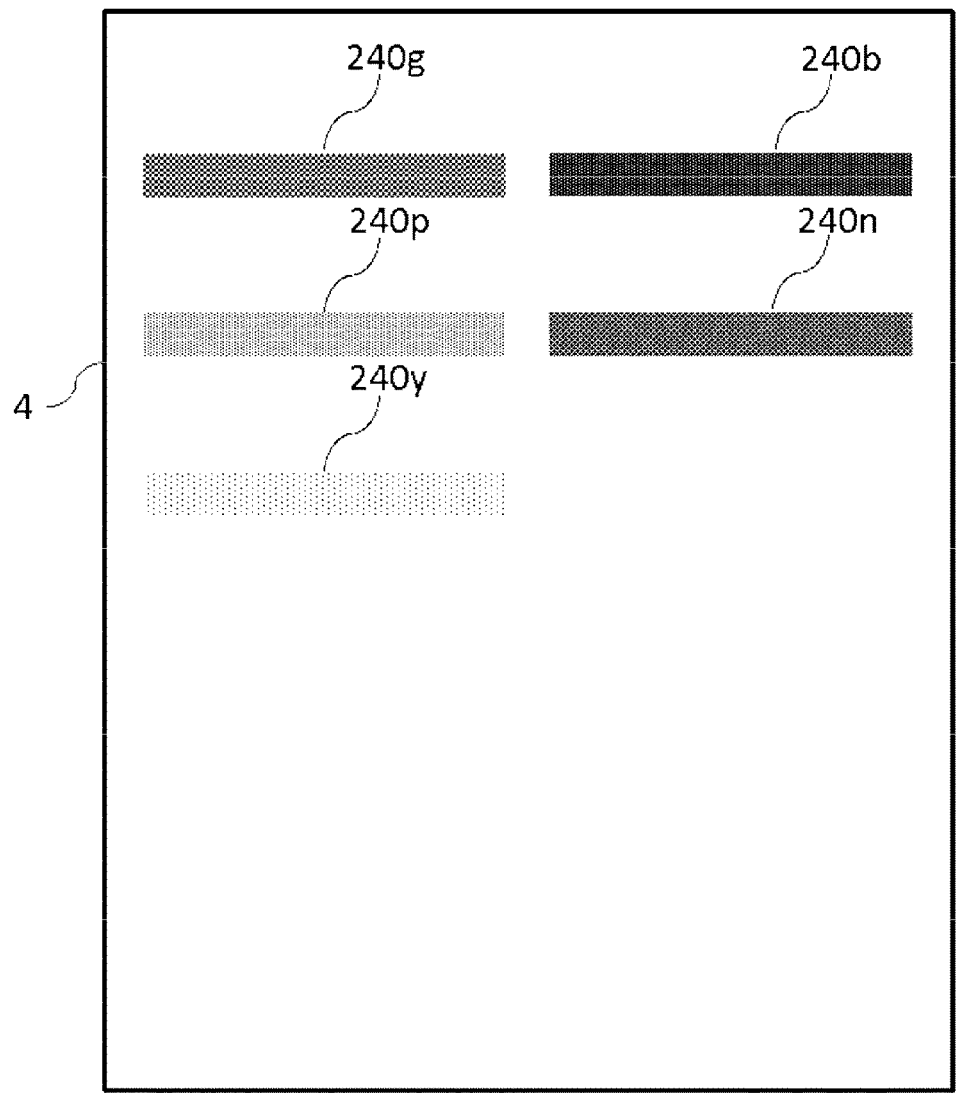
FIG. 5 is a plane view illustrating a color registration original document according to the first embodiment.

FIG. 5 is a plane view illustrating the color registration original document 4. On the color registration original document 4, hand-drawn lines for registration of the specific color information are formed. For example, a green hand-drawn line 240*g*, a pink hand-drawn line 240*p*, a yellow hand-drawn line 240*y*, a blue hand-drawn line 240*b*, and a navy hand-drawn line 240*n* are formed as the hand-drawn lines for registration of the specific color information as illustrated in FIG. 5. When the reading unit 125 reads the color registration original document 4, the color extracting unit 210 acquires color information from the hand-drawn lines formed on the color registration original document 4 and stores (registers) the color information in the color information DB. Thereafter, the process is performed while using the color information as the specific color information. Each of the hand-drawn lines formed on the color registration original document 4 may not be a straight line and may be a curved line, a character, or a figure. Hereinafter, the image processing unit 155 performs a process based on the specific color information acquired from the color registration original document 4.

FIG. 6 is a table showing the color information stored in the color information DB. The color information DB stores the specific color information acquired from the color registration original document 4 in the form of RGB values. The control unit 100 gives a color number to each piece of the information and stores the color numbers in the color information DB. In the following drawings, the description will be made while mentioning a color name associated with each color number, for convenience of explanation.

Figure 7:
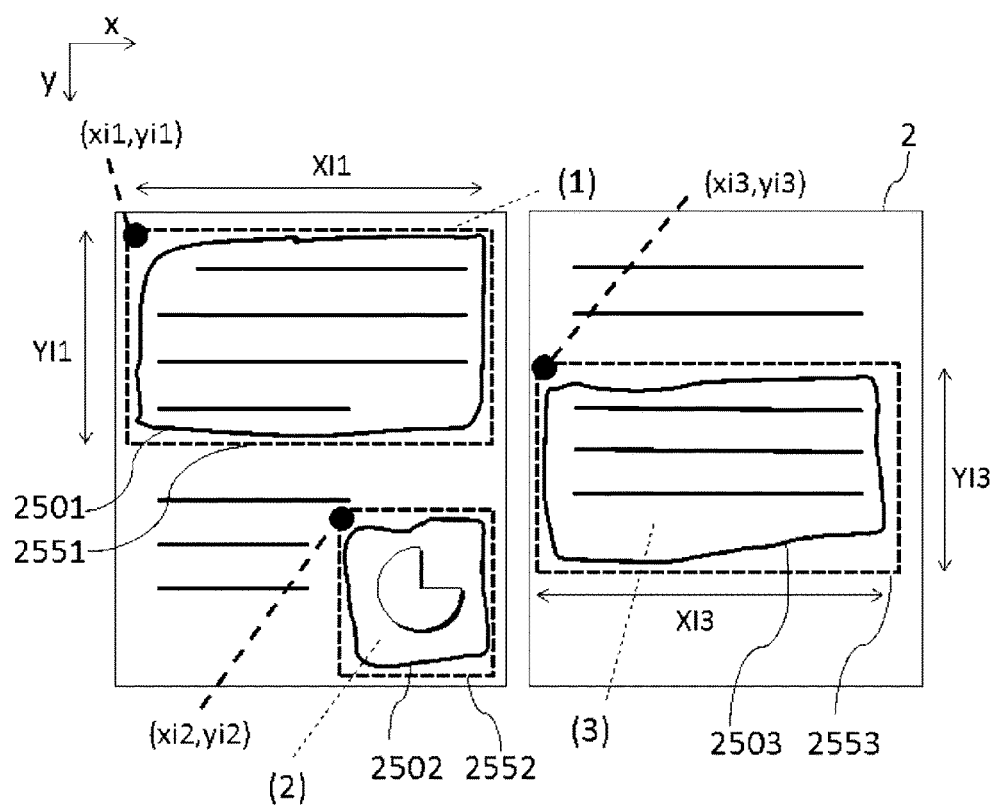
FIG. 7 is a plane view illustrating rectangularization according to the first embodiment.

FIG. 7 is a plane view illustrating the cut-out rectangle 255 including the cut-out region 250. Hereinafter, a process performed by the rectangularization unit 220 will be described by using FIG. 7. In FIG. 7, three cut-out regions 2501, 2502, and 2503, and cut-out rectangles 2551, 2552, and 2553 which include the cut-out regions 2501, 2502, and 2503 respectively, are illustrated. In FIG. 7, each cut-out region 250 is illustrated with a solid line and each cut-out rectangle 255 is illustrated with a dotted line. The rectangularization unit 220 calculates information of each cut-out rectangle 255 for each cut-out region 250 and stores the information in the region information holding unit 230.

The information of the cut-out rectangle 255 is, for example, coordinates information (xi1, yi1), size information (XI1, YI1), a region number (1), or the like of the cut-out rectangle 2551. The same process as described above is performed with respect to the layout region 260 also when the layout original document 3 is read. Hereinafter, the process with respect to the layout region 260 will be described.

The description below will be made on the assumption that each of the cut-out regions 2501, 2502, and 2503 is a cut-out region 250 that is formed by using a hand-drawn line with different color information, for example.

First, the coordinates of the cut-out rectangle 2551 of the cut-out region 2501 in the xy-coordinate system can be represented by (xi1, yi1). Here, 1 is the region number. The region number is a number that is assigned to each detected cut-out region 250 in an ascending order starting from 1. If a size in an x direction of the cut-out rectangle 2551 is XI1 and a size in a y direction of the cut-out rectangle 2551 is YI1, the coordinates of the vertexes of the cut-out rectangle 2551 can be represented by (xi1, yi1), (xi1+XI1, yi1), (xi1, yi1+YI1), and (xi1+XI1, yi1+YI1).

Here, i and I indicate that the original document is the cut-out original document 2. If the original document is the layout original document 3, i and I are replaced with o and O.

The rectangularization unit 220 acquires coordinates information and size information of the cut-out rectangles 2552 and 2553 of the cut-out regions 2502 and 2503 in the same manner as described above.

Note that, the cut-out rectangle 255 is also formed at the time of rectangularization in the layout original document 3.

If a plurality of cut-out regions 250 are surrounded by the same hand-drawn line on the cut-out original document 2, the rectangularization unit 220 may combine the cut-out regions 250 surrounded by the same hand-drawn line into one image and may store the one image in the region information holding unit 230.

The description below will be made on the assumption that the cut-out regions 2501 and 2503 in FIG. 7 are formed by using the same hand-drawn line and the cut-out regions 2502 is formed by using a hand-drawn line that is different from the hand-drawn line with which the cut-out regions 2501 and 2503 are formed.

Figure 8A:
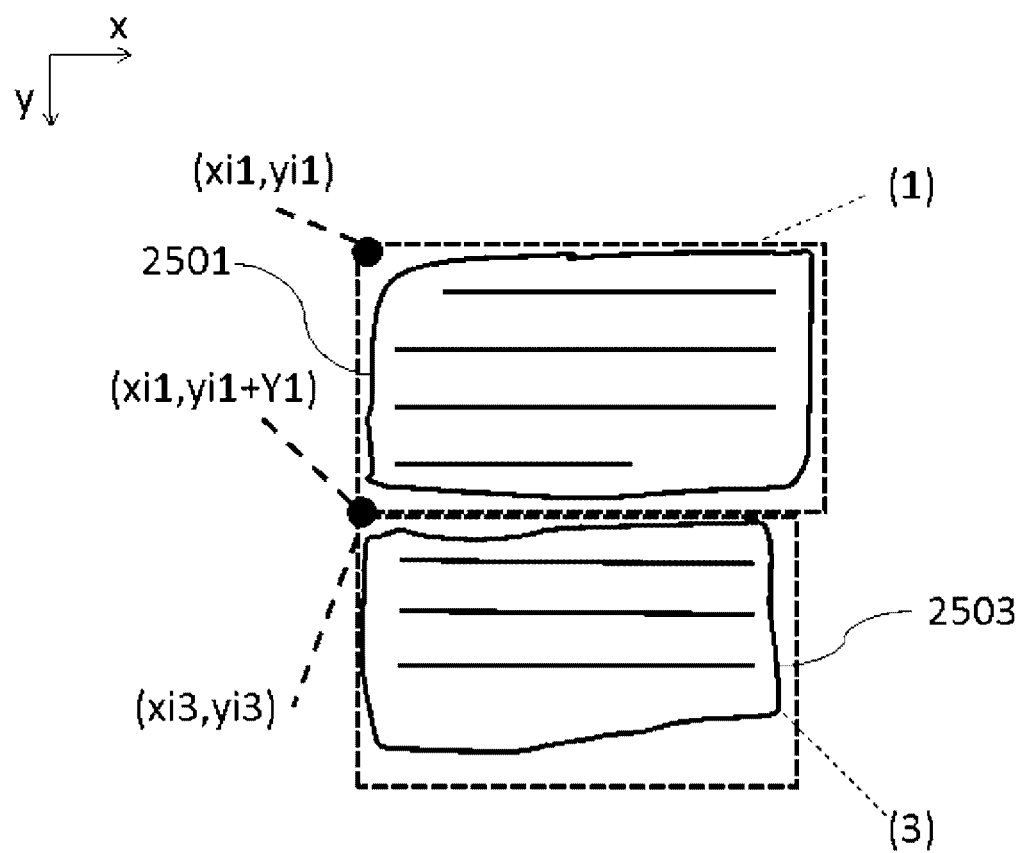
FIGS. 8A and 8B are plane views illustrating a modification example of the rectangularization according to the first embodiment.

In this case, as illustrated in FIG. 8A, the rectangularization unit 220 moves the cut-out rectangles 255 such that a vertex (xi1, yi1+YI1) of the cut-out rectangle 2551 coincides with a vertex (xi3, yi3) of the cut-out rectangle 2553 and combines the cut-out rectangles 255.

Figure 8B:
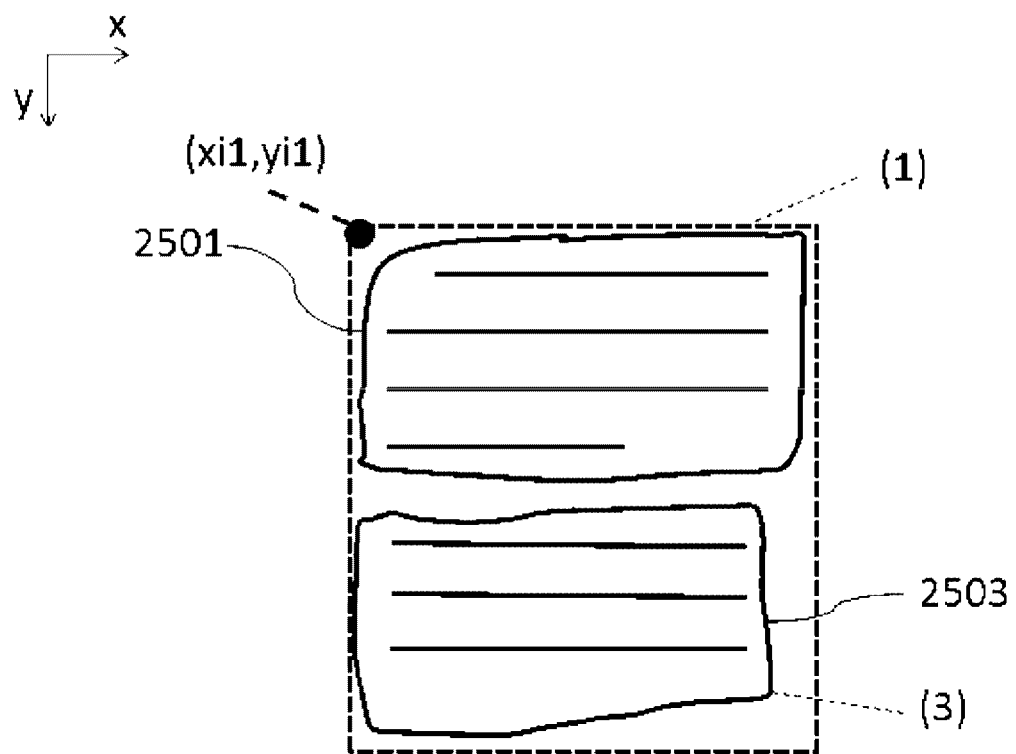

Pieces of image data included in the cut-out rectangles 255 combined as described above are treated as one piece of image data and the rectangularization unit 220 performs rectangularization with respect to the one piece of image data in the same manner as other cut-out regions 250 (FIG. 8B). Information of the cut-out rectangles 255 is stored in the region information holding unit 230.

Next, the image generating unit 165 constituting the image processing unit 155 will be described.

Figure 9:
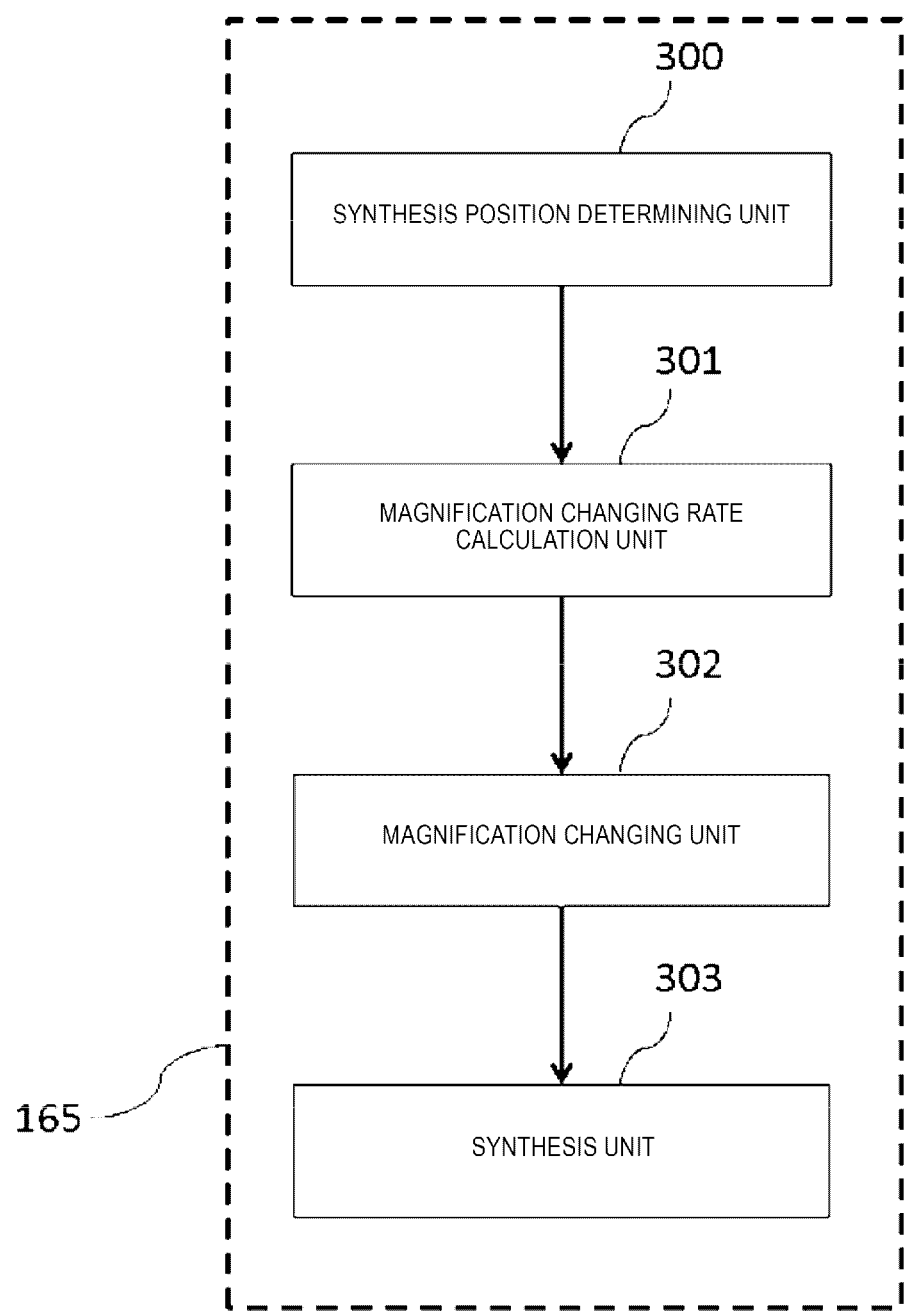
FIG. 9 is a plane view illustrating a configuration of an image generating unit according to the first embodiment.

FIG. 9 is a block diagram illustrating a configuration of the image generating unit 165 according to the first embodiment. The image generating unit 165 includes a synthesis position determining unit 300, a magnification changing rate calculation unit 301, a magnification changing unit 302, and a synthesis unit 303.

The synthesis position determining unit 300 determines a position on the original document to which the image data stored in the region information holding unit 230 is synthesized. For example, the synthesis position determining unit 300 determines the coordinates of a cut-out region 250 by referring to the coordinates of a layout region 260 surrounded by the same hand-drawn line as the cut-out region 250 based on information of the hand-drawn line which is stored in the region information holding unit 230. For example, the synthesis position determining unit 300 causes the coordinates of a cut-out region 250 surrounded by a blue hand-drawn line to coincide with the coordinates of a layout region 260 surrounded by a blue hand-drawn line.

The magnification changing rate calculation unit 301 calculates a magnification changing rate such that the cut-out rectangle 255 can be included in the layout rectangle 265 based on the rectangle size (XI and YI) of the cut-out region 250 which is a synthesis target and the rectangle size (XO and YO) of the layout region 260 to which the cut-out region 250 is synthesized.

The magnification changing unit 302 changes the size of the cut-out region 250 based on the magnification calculated by the magnification changing rate calculation unit 301.

The synthesis unit 303 synthesizes the cut-out region 250 of which the size is changed by the magnification changing unit 302 to a position corresponding to the coordinates determined by the synthesis position determining unit 300. Note that, image data generated by the synthesis is generated as image data which can be used in the same manner as a general image file by being printed by the image processing apparatus 1, being transmitted to a PC via an E-mail, or being stored in an externally accessible server.

Figure 10:
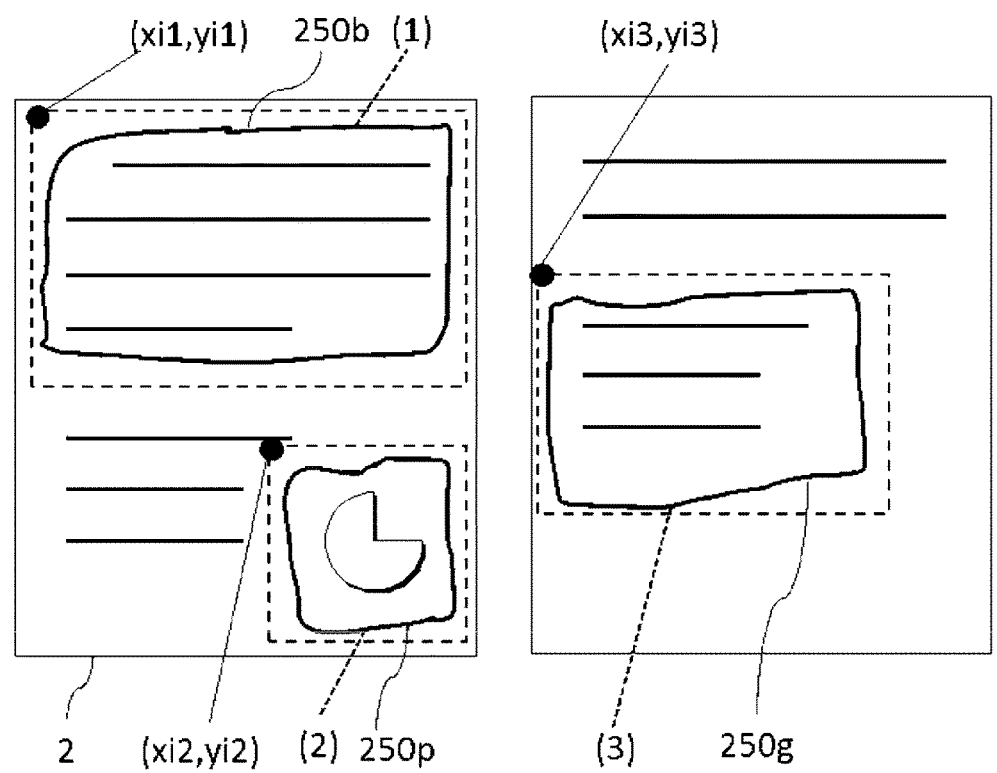
FIG. 10 is a plane view illustrating rectangularization of a cut-out region according to the first embodiment.
Figure 11:
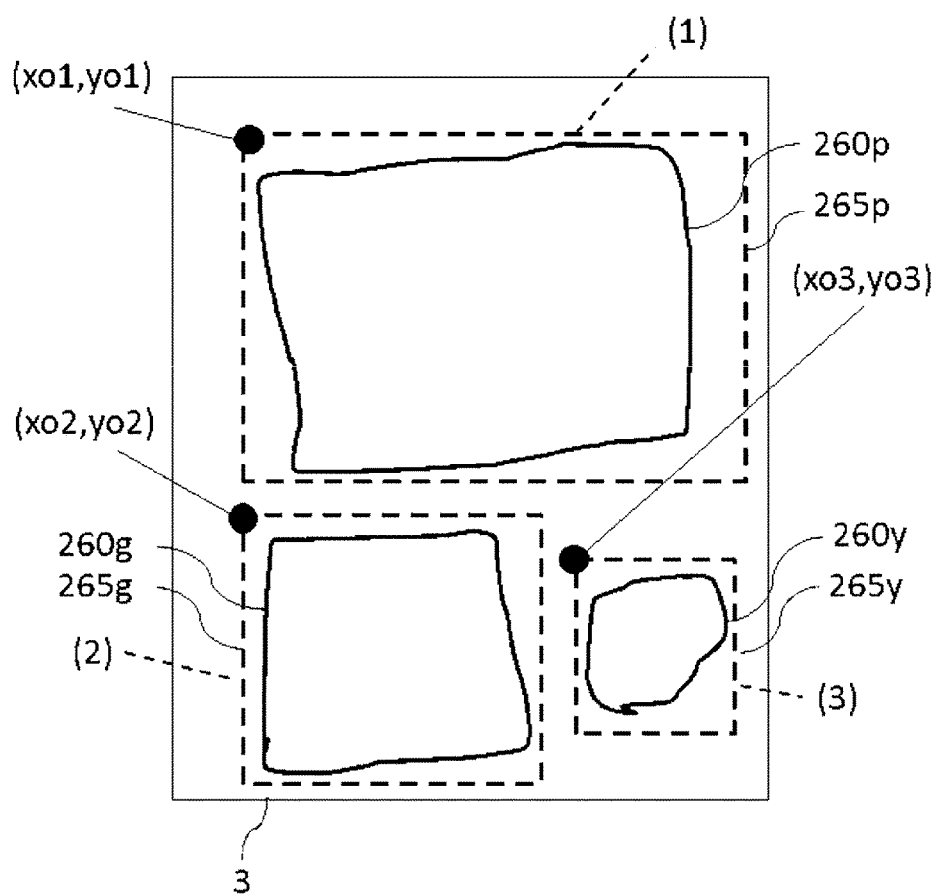
FIG. 11 is a plane view illustrating rectangularization of a layout region according to the first embodiment.

Here, an example of a process performed by the image processing unit 155 will be described with reference to FIGS. 5, 10, and 11. FIG. 10 is a plane view of the cut-out original document 2 with the cut-out region 250 formed thereon. FIG. 11 is a plane view of the layout original document 3 with the layout region 260 formed thereon.

The description below will be made on the assumption that cut-out regions 250*b*, 250*p*, and 250*g* are formed on the cut-out original document 2 in FIG. 10 with blue, pink, and green hand-drawn lines, which are hand-drawn lines with the specific color information that is registered as illustrated in FIG. 5. With respect to the cut-out regions 250*b*, 250*p*, and 250*g*, as with FIG. 7, the rectangularization unit 220 performs rectangularization of the cut-out regions 250, forms cut-out rectangles 255 such that lines of the regions are included in the cut-out rectangles 255, and counts region numbers (1), (2), and (3). In the region information holding unit 230, the coordinates information, the size information, the color number, and the region number of each cut-out rectangle 255 and image data in each region are stored while being associated with each other.

The description below will be made on the assumption that layout regions 260*p*, 260*g*, and 260*y* are formed on the layout original document 3 in FIG. 11 with pink, green, and yellow hand-drawn lines, which are hand-drawn lines with the specific color information that is registered as illustrated in FIG. 5. With respect to the layout regions, as with the rectangularization of the cut-out region 250 in FIG. 7, the rectangularization unit 220 forms layout rectangles 265 such that the layout regions 260 are included in the layout rectangles 265 and counts region numbers (1), (2), and (3). In the region information holding unit 230, the coordinates information, the size information, the color number, and the region number of each layout rectangle 265 are stored while being associated with each other.

Figure 12:
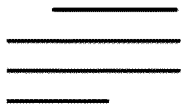
FIG. 12 is a table showing information stored in a region information holding unit according to the first embodiment.
Figure 12:
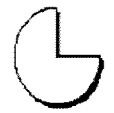
Figure 12:
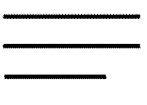

FIG. 12 is an example of a table showing information stored in the region information holding unit 230 according to the first embodiment. In this example, the type of a region is represented by I if the type of a region is the cut-out region 250 and the type of a region is represented by O if the type of a region is the layout region 260.

The synthesis position determining unit 300 calculates a synthesis position and the magnification changing rate calculation unit 301 calculates a magnification changing rate based on such information. For example, the coordinates of the layout region 260*p*, which is formed by using the pink hand-drawn line, are caused to match the coordinates of the cut-out region 250*p*, which is formed by using the pink hand-drawn line. Furthermore, the magnification changing unit 302 performs a magnification changing process such that the cut-out rectangle 255*p* of the cut-out region 250*p* is included in the layout rectangle 265*p* of the layout region 260*p* and the synthesis unit 303 performs image synthesis.

Next, the same process is performed on the layout region 260*g*, which is formed by using the green hand-drawn line. In this manner, the same process is performed on each layout region 260 stored in the region information holding unit 230 in a sequential manner. Here, information of a cut-out region 250 corresponding to the layout region 260*y*, which is formed by using the yellow hand-drawn line, is not stored. Therefore, the image generating unit 165 proceeds to a process with respect to the next region without performing a process for image synthesis.

Similarly, since information of a layout region 260 corresponding to the cut-out region 250*b* in FIG. 10, which is formed by using the blue hand-drawn line, is not stored, the image generating unit 165 proceeds to a process with respect to the next region without performing a process. These processes are performed for all regions.

Figure 13:
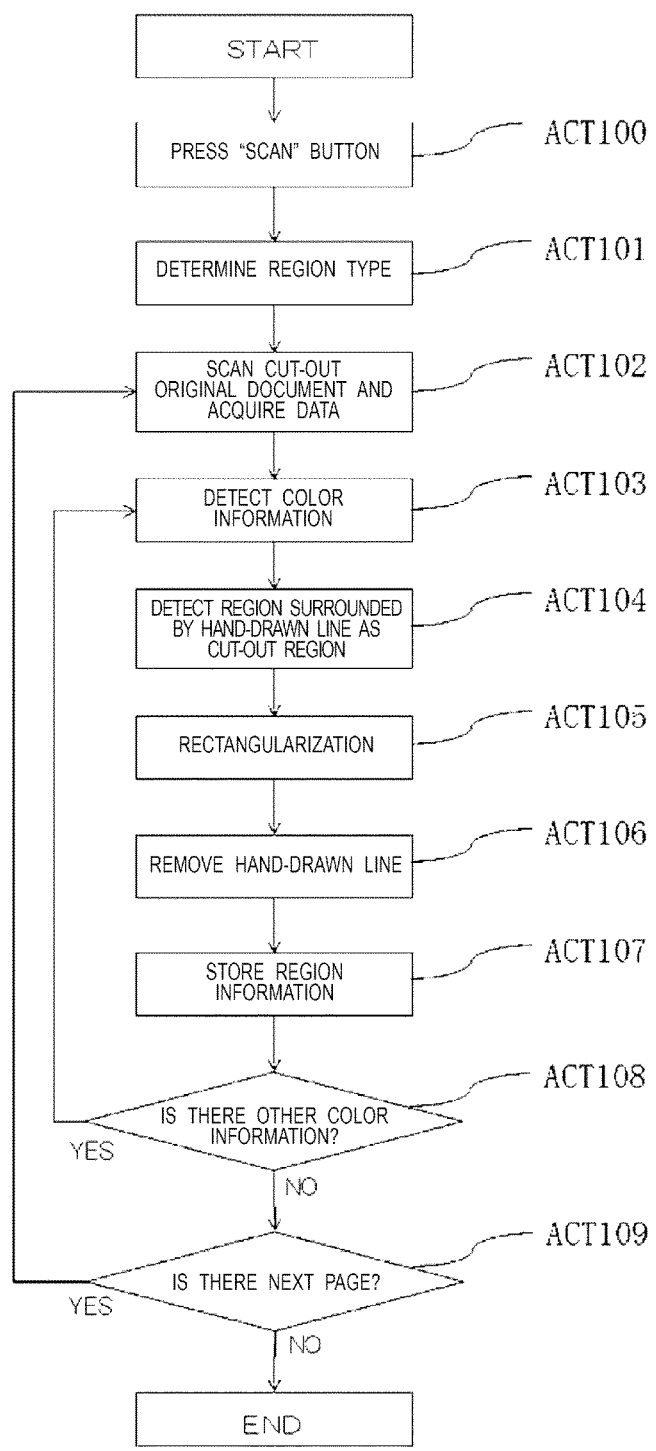
FIG. 13 is a flow chart of a method for acquiring information of the cut-out region according to the first embodiment.

FIG. 13 is a flow chart illustrating a process of storing a cut-out region 250 according to the first embodiment. Before the process is started, the control unit 100 causes the reading unit 125 to read the color registration original document 4 and stores the specific color information in the color information DB. When the "scan" button 135 (*a*) on the control panel 135 is pushed, the control unit 100 causes the reading unit 125 to start to read an original document (ACT 100). Since the "scan" button 135 (*a*) is pressed at this time, the region type determining unit 200 determines that the type of an original document to be read by the reading unit 125 is the cut-out original document 2 (ACT 101). The reading unit 125 reads the cut-out original document 2 with a scanner and acquires image data (ACT 102).

Next, the control unit 100 detects whether a hand-drawn line is included in the acquired image data by using the color extracting unit 210 and determines color information of the hand-drawn line if the hand-drawn line is included in the acquired image data (ACT 103). If a hand-drawn line is detected, the control unit 100 causes the region detecting unit 215 to determine that a region surrounded by the hand-drawn line is a cut-out region 250 (ACT 104). Thereafter, the control unit 100 causes the rectangularization unit 220 to form a cut-out rectangle 255 such that a line forming the cut-out region 250, which is detected by the region detecting unit 215, is included in the cut-out rectangle 255 (ACT 105). The control unit 100 causes the color removing unit 225 to remove the hand-drawn line forming the region in the image data (ACT 106). The control unit 100 stores a region type, rectangle information, color information, and image information, which are calculated through the above-described processes, in the region information holding unit 230 in association with each region (ACT 107).

Thereafter, if the color extracting unit 210 detects a hand-drawn line with other specific color information (YES in ACT 108), the control unit 100 repeats processes of ACT 103 to ACT 107 until region information of all of the cut-out regions 250, each of which is surrounded by a hand-drawn line, is stored. After region information of all of the cut-out regions 250 is stored, if the cut-out original document 2 has another page (YES in ACT 109), the control unit 100 repeats processes of ACT 102 to ACT 108 such that the above-described processes are performed with respect to every page. When the processes are performed with respect to every page (NO in ACT 109), the control unit 100 terminates a series of processes of storing information of the cut-out region 250.

Figure 14:
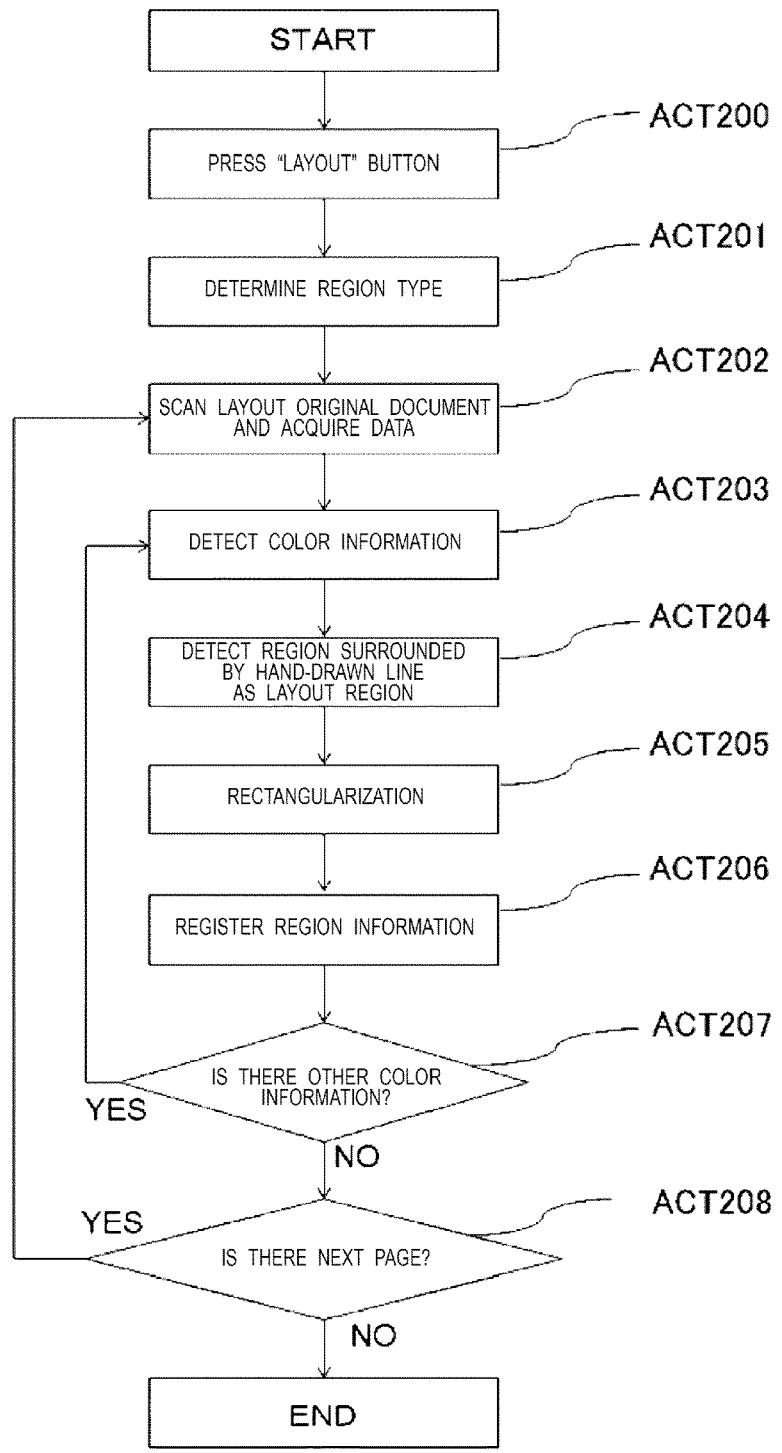
FIG. 14 is a flow chart of a method for acquiring information of the layout region according to the first embodiment.

FIG. 14 is a flow chart illustrating a process of storing a layout region 260 which is performed by the image processing apparatus 1 according to the first embodiment. When the "layout" button 135 (*b*) on the control panel 135 is pushed, the control unit 100 causes the reading unit 125 to start to read an original document (ACT 200). Since the "layout" button 135 (*b*) is pressed at this time, the region type determining unit 200 determines that the type of an original document to be read by the reading unit 125 is the layout original document 3 (ACT 201). The reading unit 125 reads the layout original document 3 with the scanner and acquires image data (ACT 202).

Next, the control unit 100 detects whether a hand-drawn line is included in the acquired image data by using the color extracting unit 210 and determines color information of the hand-drawn line if the hand-drawn line is included in the acquired image data (ACT 203). If a hand-drawn line is detected, the control unit 100 causes the region detecting unit 215 to determine that a region formed by using the hand-drawn line is a layout region 260 (ACT 204). Thereafter, the control unit 100 causes the rectangularization unit 220 to form a layout rectangle 265 such that a line forming the layout region 260, which is detected by the region detecting unit 215, is included in the layout rectangle 265 (ACT 205). The control unit 100 stores a region type, rectangle information, and color information, which are calculated through the above-described processes, in the region information holding unit 230 in association with each region (ACT 206).

If the color extracting unit 210 detects a hand-drawn line with other specific color information (YES in ACT 207), the control unit 100 repeats processes of ACT 203 to ACT 206 until region information of all of the regions is stored. After region information of all of the regions is stored (NO in ACT 207), if the layout original document 3 has another page (YES in ACT 208), the control unit 100 repeats processes of ACT 202 to ACT 207 such that the above-described processes are performed with respect to every page. When the processes are performed with respect to every page (NO in ACT 208), the control unit 100 terminates a series of processes of storing information of the layout region 260.

Figure 15:
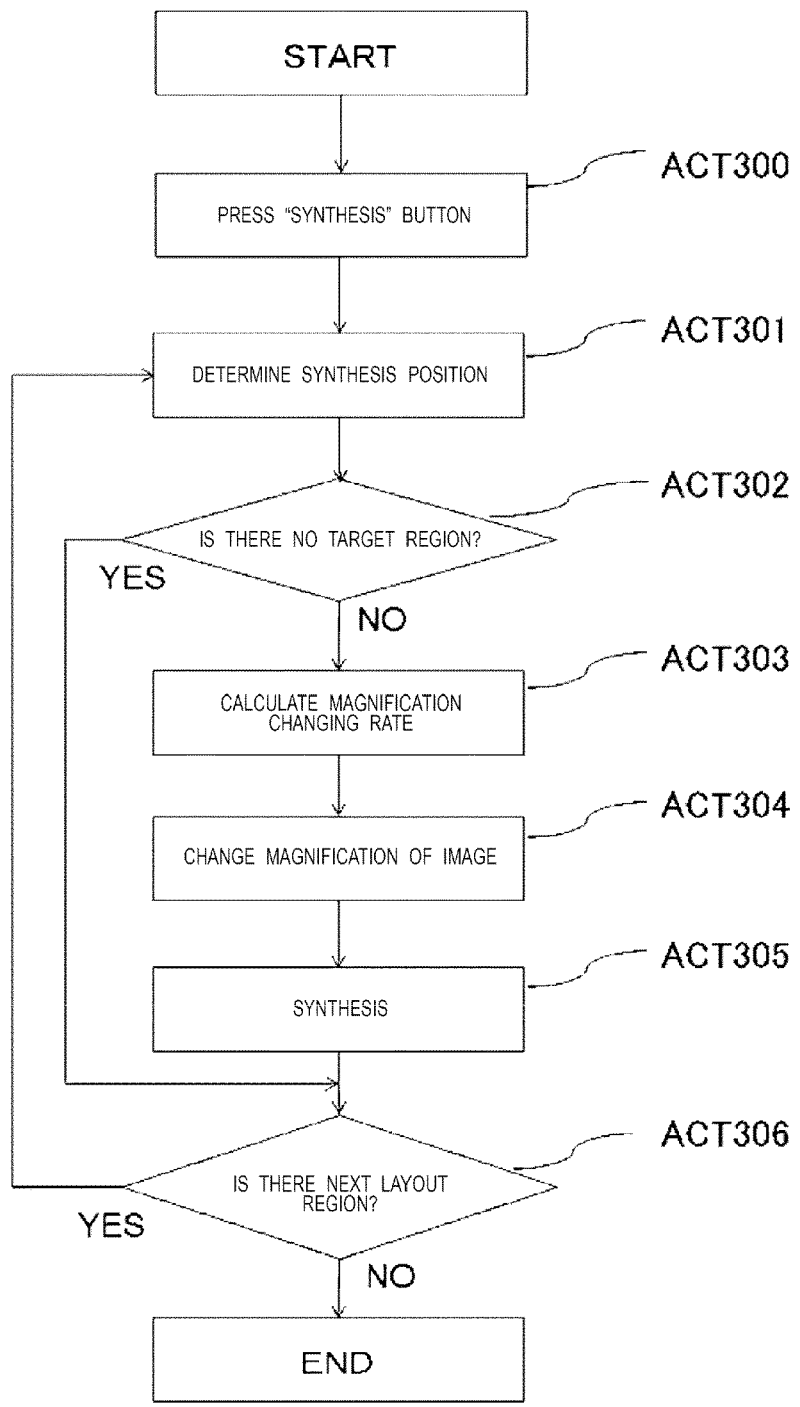
FIG. 15 is a flow chart of image synthesis according to the first embodiment.

FIG. 15 is a flow chart illustrating a process for image synthesis according to the first embodiment.

If the "synthesis" button on the control panel 135 is pushed, the control unit 100 causes the image generating unit 165 to start image data synthesis based on information stored in the region information holding unit 230 (ACT 300). The synthesis position determining unit 300 determines the coordinates of a synthesis position on an original document based on the rectangle information of the layout region 260 (ACT 301). Thereafter, the control unit 100 determines whether there is information of a cut-out region 250 with the same color information as color information of the layout region 260 by using the synthesis unit 303 (ACT 302). If there is no corresponding cut-out region 250 (YES in ACT 302), the control unit 100 causes the process to proceed to ACT 306. If there is a corresponding cut-out region 250 (NO in ACT 302), the control unit 100 causes the magnification changing rate calculation unit 301 to calculate the magnification of the cut-out region 250 such that the cut-out region 250 is included in the layout region 260 (ACT 303). Next, the control unit 100 causes the magnification changing unit 302 to change the size of the cut-out region 250 based on the magnification calculated by the magnification changing rate calculation unit 301 (ACT 304). After the above-described processes are performed, the control unit 100 causes the synthesis unit 303 to synthesize the cut-out region 250, which is subject to the magnification changing process, to the synthesis position calculated by the synthesis position determining unit 300 (ACT 305).

The control unit 100 performs the above-described processes for all of the stored layout regions 260. If there is a layout region 260 to be subject to the processes (YES in ACT 306), the control unit 100 repeats the processes of ACT 301 to ACT 305 until all of the layout regions 260 are subject to the processes. If there is no more layout region 260 to be subject to the processes (NO in ACT 306), the control unit 100 terminates a series of processes for image generation.

As described above, the image processing apparatus in the first embodiment can extract a character or a symbol, which is previously formed on the cut-out original document and the layout original document, from an image on the cut-out original document by using a hand-drawn line and to generate a new image since specific color information from a color registration original document which is registered in advance.

Second Embodiment

Next, a second embodiment will be described with reference to drawings. Since the configuration of the image processing apparatus 1 in the second embodiment is the same as that of the first embodiment, components in the image processing apparatus are given the same reference numerals and description thereof will be omitted.

In the first embodiment, the specific color information is stored in the color information DB with the reading unit 125 reading the color registration original document 4. However, in the second embodiment, color information acquired from the layout original document 3 is treated as the specific color information. That is, the control unit 100 stores color information, which is acquired from the layout original document 3, in the color information DB and the reading unit 125 does not need to read the color registration original document 4.

A process performed by the image processing unit 155 according to the second embodiment will be described with reference to FIGS. 10, and 11.

The layout original document 3 in FIG. 11 has three layout regions 260*p*, 260*g*, and 260*y* which are formed by using pink, green, and yellow hand-drawn lines, respectively. With respect to the layout regions 260, the rectangularization unit 220 forms layout rectangles 265*p*, 265*g*, and 265*y* such that lines of the regions are included in the layout rectangles 265*p*, 265*g*, and 265*y* and counts region numbers (1), (2), and (3) for each region. In addition, the control unit 100 respectively assigns color numbers of 1 to 3 to pieces of color information extracted by the color extracting unit 210. The control unit 100 stores RGB values and the color numbers of the pieces of color information in the color information DB. Thereafter, in the region information holding unit 230, the coordinates information, the size information, the color number, and the region number of each layout rectangle 265 are stored while being associated with each other.

The cut-out original document 2 in FIG. 10 has three cut-out regions 250*b*, 250*p*, and 250*g* which are formed by using blue, pink, and green hand-drawn lines, respectively. When the reading unit 125 reads the cut-out original document 2, the color extracting unit 210 detects a region based on color information acquired from image data on the layout original document 3 which is previously read.

In other words, the blue hand-drawn line, which is one of the hand-drawn lines forming the three cut-out regions 250*b*, 250*p*, and 250*g* on the cut-out original document 2 in FIG. 10, is not stored in the color information DB as specific information detected from the layout original document 3. Therefore, the cut-out region 250*b* that is formed by using the blue hand-drawn line is not treated as the cut-out region 250. Accordingly, rectangularization of the cut-out region 250*b* is not performed and information of the cut-out region 250*b* is not stored.

Meanwhile, rectangularization is performed with respect to the cut-out region 250*p* that is formed by using the pink hand-drawn line and the cut-out region 250*g* that is formed by using the green hand-drawn line. Then, cut-out rectangles 255 are formed such that the regions are included in the cut-out rectangles 255 and region numbers (1) and (2) are counted for each cut-out region. In addition, the control unit 100 assigns a color number of 1 to pink and assigns a color number of 2 to green at the same time as when the layout original document 3 is read. Thereafter, the region information holding unit 230 stores the coordinates information, the size information, the color number, and the region number of each cut-out rectangle 255 and image data in each region.

If a piece of color information that is not detected when the cut-out original document 2 is read exists in color information that is stored when the layout original document 3 is read, the control unit 100 may cause the control panel 135 to perform a notification to that effect through a displaying operation or the like.

Figure 16:
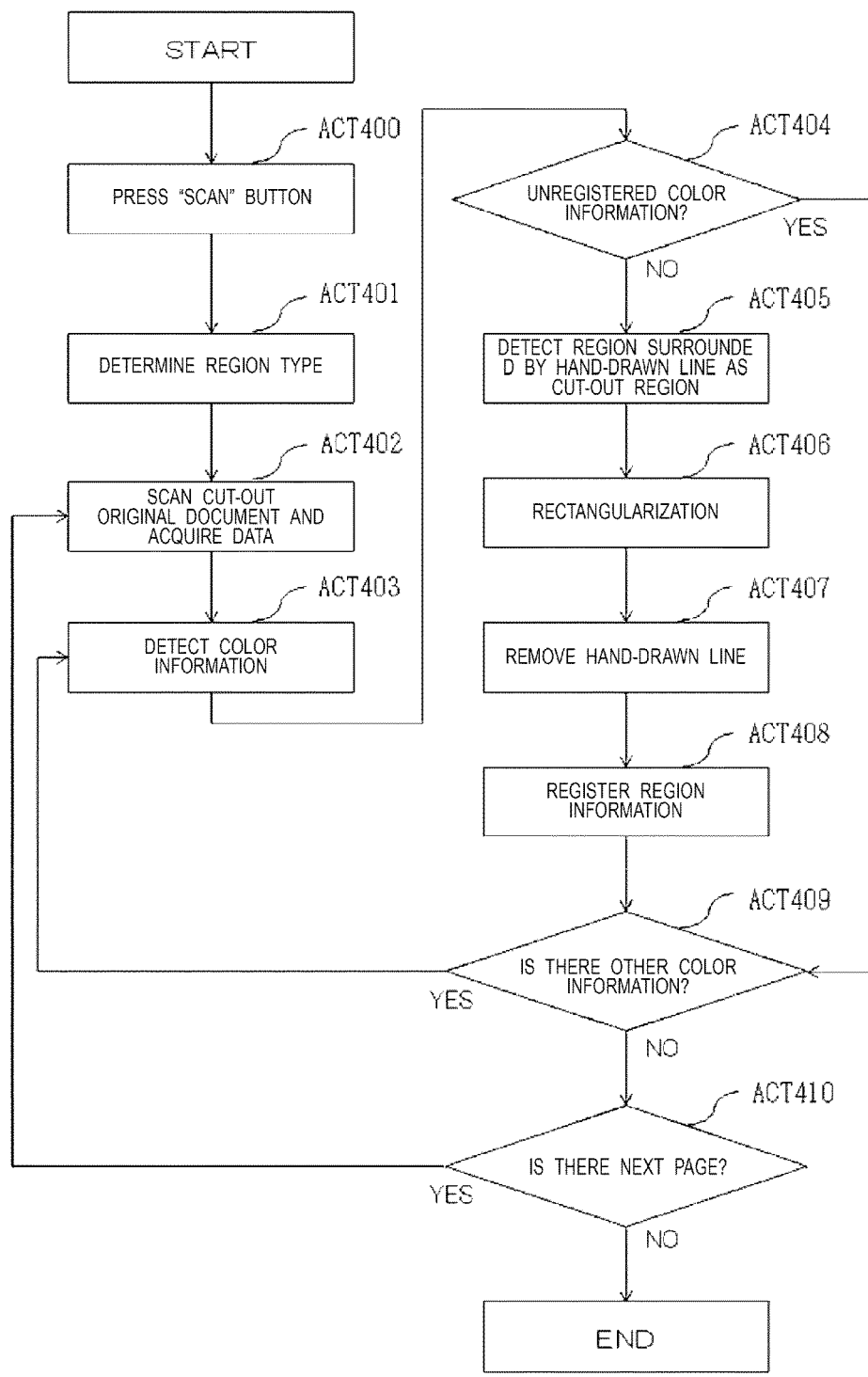
FIG. 16 is a flow chart of a method for acquiring information of a cut-out region according to a second embodiment.

FIG. 16 is a flow chart illustrating a process of storing a cut-out region 250 which is performed by the image processing apparatus 1 according to the second embodiment. Before the following processes are performed, the reading unit 125 acquires information of the layout region 260 from the layout original document 3 and the region information holding unit 230 stores the information. This process is the same as that in FIG. 14 and thus description thereof will be omitted.

When the "scan" button 135 (*a*) on the control panel 135 is pushed, the control unit 100 causes the reading unit 125 to start to read an original document (ACT 400). At this time, the control unit 100 may cause the control panel 135 to perform a displaying operation or the like such that the reading unit 125 is caused to read the cut-out original document 2. Since the "scan" button 135 (*a*) is pressed at this time, the region type determining unit 200 determines that the type of an original document to be read by the reading unit 125 is the cut-out original document 2 (ACT 401). The reading unit 125 reads the original document with the scanner and acquires image data (ACT 402).

Next, the control unit 100 detects whether a hand-drawn line is included in the acquired image data by using the color extracting unit 210 and determines color information of the hand-drawn line if the hand-drawn line is included in the acquired image data (ACT 403). Here, the control unit 100 does not cause the rectangularization unit 220 to perform rectangularization with respect to a cut-out region 250 that is formed by using a hand-drawn line with color information that is not detected when the layout original document 3 is read and does not store information of the cut-out region 250 in the region information holding unit 230. Thereafter, the control unit 100 proceeds to a process for the next cut-out region 250 (YES in ACT 404). If color information that is detected when the layout original document 3 is read is detected (NO in ACT 404), the control unit 100 causes the region detecting unit 215 to determine that a region surrounded by the hand-drawn line is a cut-out region 250 (ACT 405).

Thereafter, the control unit 100 causes the rectangularization unit 220 to form a cut-out rectangle 255 such that the cut-out region 250 detected by the region detecting unit 215 is included in the cut-out rectangle 255 (ACT 406). The control unit 100 causes the color removing unit 225 to remove the hand-drawn line forming the cut-out region 250 from the image data (ACT 407). The control unit 100 stores a region type, coordinates information, size information, and color information, which are calculated through the above-described processes, in the region information holding unit 230 in association with each region (ACT 408). Thereafter, if the color extracting unit 210 detects a hand-drawn line with other specific color information (YES in ACT 409), the control unit 100 repeats processes of ACT 403 to ACT 408 until region information of all of the cut-out regions 250, each of which is surrounded by a hand-drawn line, is stored. After region information of all of the cut-out regions 250 is stored, if the cut-out original document 2 has another page (YES in ACT 410), the control unit 100 repeats processes of ACT 402 to ACT 409 such that the above-described processes are performed with respect to every page. When the processes are performed with respect to every page (NO in ACT 410), a series of processes of storing the cut-out region 250 is terminated.

If information of the layout region 260 and the cut-out region 250 is stored in the region information holding unit 230, image data synthesis is performed as described in FIG. 15.

As described above, the image processing apparatus in the second embodiment is capable of performing an image generating process by acquiring specific color information from a layout original document even if a color registration original document is not read in advance.

Third Embodiment

Next, a third embodiment will be described with reference to drawings.

In a case where hand-drawn lines that are detected from the cut-out original document 2 include a hand-drawn line that is not detected from the layout original document 3, the image processing apparatus 1 according to the third embodiment performs the process on the assumption that the hand-drawn line is the same as a hand-drawn line with the most similar color information out of hand-drawn lines detected from the layout original document 3. Since the configuration of the image processing apparatus 1 in the third embodiment is the same as that of the first embodiment, components in the image processing apparatus are given the same reference numerals and description thereof will be omitted.

A process performed by the image processing unit 155 according to the third embodiment will be described with reference to FIGS. 6, 17, and 18. Before these processes are performed, the specific color information is stored in the color information DB with the color registration original document 4 being read in advance as in the first embodiment.

Figure 17:
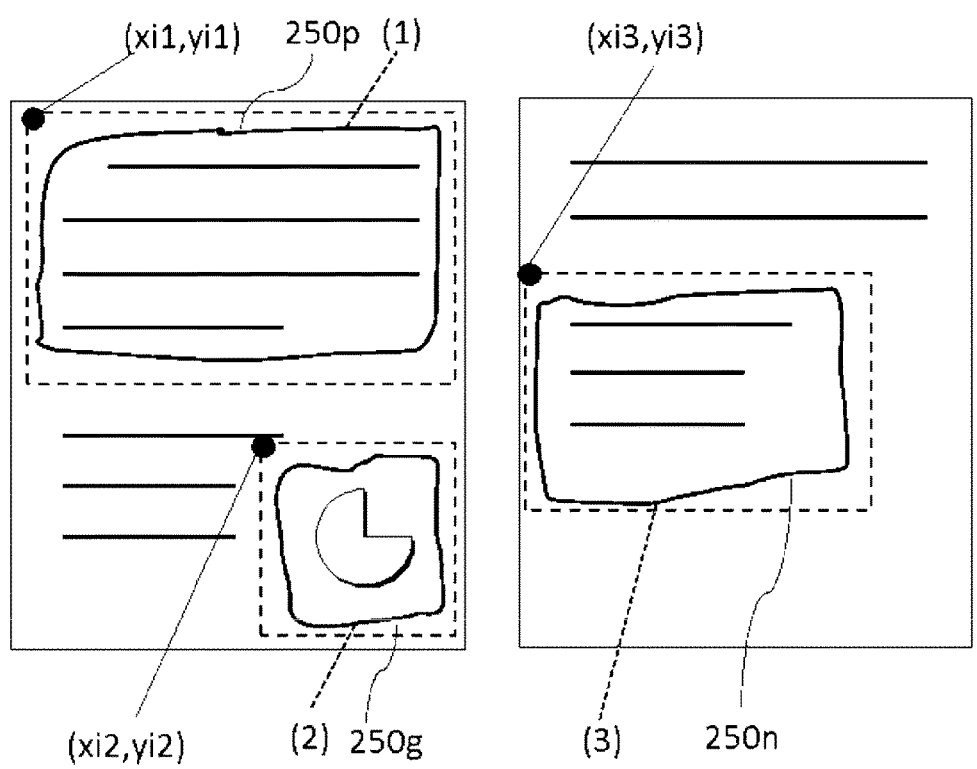
FIG. 17 is a plane view illustrating rectangularization of a cut-out region according to a third embodiment.

The cut-out original document 2 in FIG. 17 has three cut-out regions 250p, 250g, and 250n which are formed by using pink, green, and navy hand-drawn lines, respectively. With respect to the cut-out regions 250, as with the second embodiment, the rectangularization unit 220 performs rectangularization and counts region numbers (1), (2), and (3). In the region information holding unit 230, the coordinates information, the size information, the color number, and the region number of each rectangle are stored while being associated with each other.

Figure 18:
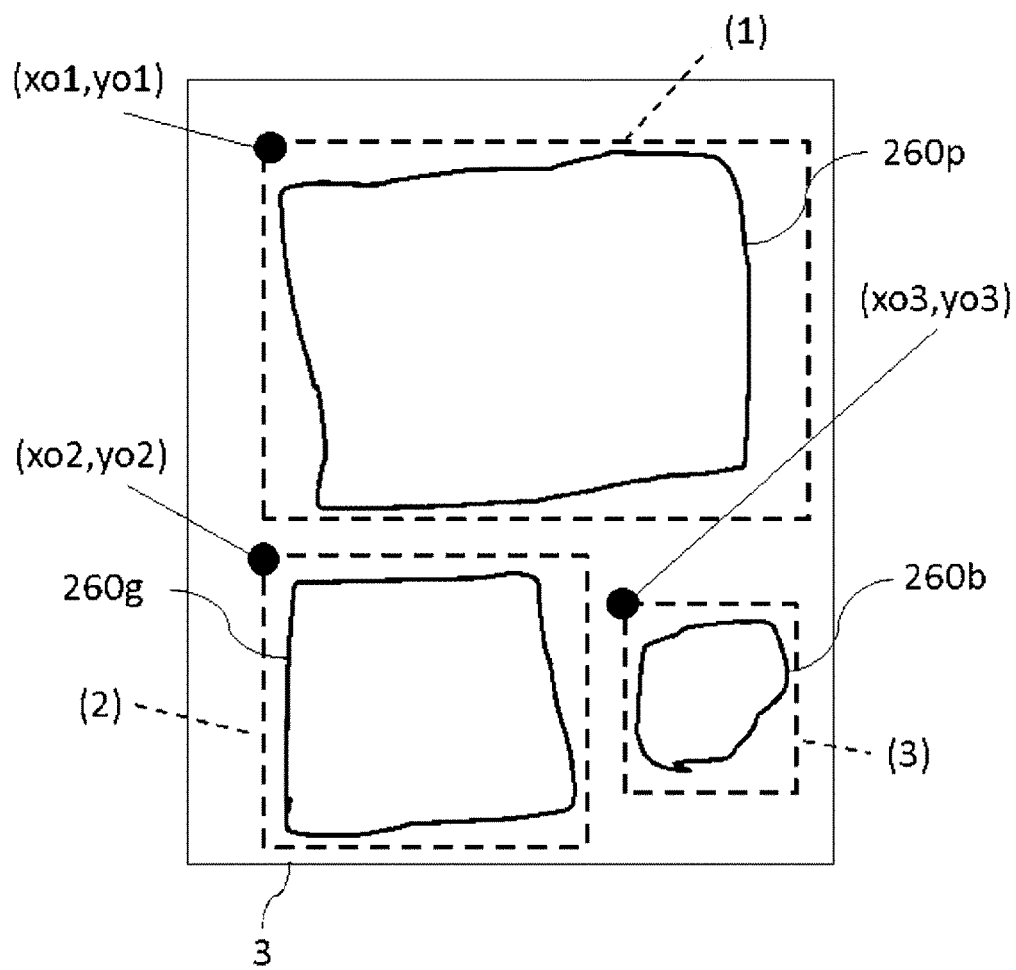
FIG. 18 is a plane view illustrating rectangularization of a layout region according to the third embodiment.

The layout original document 3 in FIG. 18 has three layout regions 260p, 260g, and 260b which are formed by using pink, green, and blue hand-drawn lines, respectively. With respect to the regions, the rectangularization unit 220 performs rectangularization and counts region numbers (1), (2), and (3). In the region information holding unit 230, the coordinates information, the size information, the color number, and the region number of each rectangle are stored while being associated with each other.

FIG. 19 is a table showing region information of cut-out regions 250 and layout regions 260 stored in the region information holding unit 230. Although the cut-out original document 2 has the cut-out regions 250p, 250g, and 250n which are formed by using the pink, green, and navy hand-drawn lines, respectively, color information of the navy hand-drawn line, which is one of the pink, green, and navy hand-drawn lines, is not stored as color information from the layout original document 3. In this case, the color information of the navy hand-drawn line is treated as color information that is the same as color information that is the most similar to the color information of the navy hand-drawn line in color information stored as information of the layout original document 3.

For example, it is determined whether color information detected from the cut-out original document 2 is similar to color information detected from the layout original document 3 by using the length of a vector based on RGB values in the RGB color space.

Regarding two three-dimensional vectors A=(Ai, Aj, Ak) and B=(Bi, Bj, Bk), the length |AB| of a vector AB can be represented as the following formula.

$$|AB|=((Bi-Ai)^2+(Bj-Aj)^2+(Bk-Ak)^2)^{(1/2)}$$

According to the above formula, the length of a navy-pink vector can be represented as 266, the length of a navy-green vector can be represented as 274, and the length of a navy-blue vector can be represented as 155.

Since the length of the navy-blue vector has the smallest value, it is determined that color information of navy is similar to color information of blue and the color information of navy is treated as the color information of blue in the synthesis process described in FIG. 15.

Note that, a threshold value may be set for the length of a vector so that the color extracting unit 210 does not treat pieces of color information as pieces of color information similar to each other even for a combination of pieces of color information in which the length of a vector has the smallest value if the value is equal to or greater than the threshold value. For example, if a threshold value is set to 90, since the length of the navy-blue vector is greater than or equal to the threshold value, navy and blue are not treated as similar colors.

Figure 20:
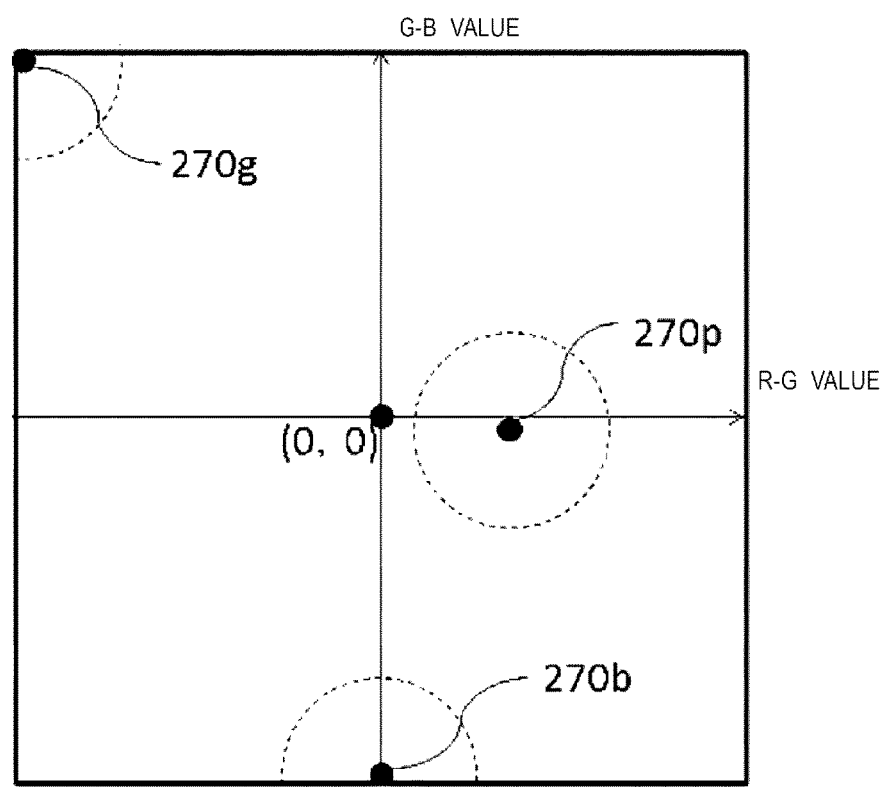
FIG. 20 is a plane view illustrating a method for determining similar color information according to the third embodiment.

A method for determination on whether color information of a hand-drawn line is similar color information which is performed by the control unit 100 is not limited to the above-described method and the determination may be made based on color difference or variation. For example, the control unit 100 can determine whether pieces of color information are similar to each other through two-dimensional expression of color information in which the horizontal axis represents a value of (R-G) and the vertical axis represents a value of (G-B), as illustrated in FIG. 20. For example, since RGB values of blue are (0, 0, 255), coordinates 270b can be represented by (0, -255). Similarly, the coordinates 270g of green are (255, -255) and the coordinates 270p of pink are (80, -10). Furthermore, the control unit 100 sets a threshold value for providing a range of the similarity of color information. The threshold value is a range for regarding color information that is not stored in the color information DB as the specific color information. Dotted lines in FIG. 20 represent ranges for regarding color information that is not stored in the color information DB as similar color information. Here, ±70 with respect to the coordinates of each color information is set as the threshold value. Therefore, for example, color information with coordinates of (80±70, -10±70) is treated as color information of pink.

In this manner, an image synthesis process is performed with the cut-out region 250 and the layout region 260 being correlated with each other.

In the above-described example, the reading unit 125 acquires color information by reading the color registration original document 4 before reading the cut-out original document 2 and the layout original document 3. However, the reading unit 125 may acquire specific color information by reading the layout original document 3 before reading the cut-out original document 2. In this case, when the cut-out original document 2 is read, the color extracting unit 210 determines whether color information acquired from the cut-out original document 2 is similar to color information from the layout original document 3 which is registered in the color information DB in advance.

In the above-described example, it is determined whether pieces of color information are similar to each other when the color extracting unit 210 determines color information of a hand-drawn line. However, color information of the cut-out region 250 and color information of the layout region 260 may be compared with each other based on information stored in the region information holding unit 230 so that it is determined whether the color information of the cut-out region 250 and the color information of the layout region 260 are similar to each other.

As described above, the image processing apparatus in the third embodiment is capable of performing an image generating process while recognizing a region on a cut-out original document which is formed by using a hand-drawn line that is similar to a hand-drawn line formed on a layout original document as a cut-out region.

In the above-described embodiments, if color information that can be acquired from only one of the cut-out original document 2 and the layout original document 3 exists in color information stored in the region information holding unit 230, the control unit 100 may notify a user of the existence of the color information. The notification is performed through a displaying operation or the like of the control panel 135.

Each of the layout original document 3 and the color registration original document 4 may not be a white paper sheet. In addition, the layout original document 3 may be a sheet with an image formed thereon in advance.

The order in which the processes in the above-described embodiments are performed may be changed as long as the effect of the processes is not changed. For example, in the above-described embodiments, if it is determined that there is other color information in ACT 207 in FIG. 11, a process for the next page is started after region information for every color information is stored. However, a process for the next color information may be performed after a process for one color information piece is performed for every page.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a reader configured to read an image on a sheet;
a processor configured to acquire image data from the image read by the reader;
the processor configured to extract color information from the image data;
a storage memory configured to store specific color information;
the processor configured to extract second image data surrounded by a line with the specific color information in first image data that the processor acquires from a first image area on a first sheet which is read by the reader, the first image area on the first sheet designated by at least one first marking in a specific color;
the processor configured to generate third image data based on the second image data, the third image data corresponding to a second image area designated by at least one second marking in the same specific color as the at least one first marking; and
a printer configured to print a second image based on the third image data on a region of a sheet corresponding to the second image area.

2. The apparatus according to claim 1,
wherein the storage memory is configured to store layout position information that is associated with the specific color information, and
wherein the processor is configured to generate the third image data based on the second image data and the layout position information.

3. The apparatus according to claim 2,
wherein the processor is configured to acquire fourth image data from an image on a second sheet which is read by the reader, and
wherein the layout position information is position information of a region surrounded by a line with the specific color information in the fourth image data.

4. The apparatus according to claim 2,
wherein the processor is configured to acquire sixth image data from an image on a fourth sheet which is read by the reader,
wherein the specific color information is color information extracted from the sixth image data, and
wherein the layout position information is position information of a region surrounded by a line with the specific color information in the sixth image data.

5. The apparatus according to claim 1,
wherein the processor is configured to acquire fifth image data from an image on a third sheet which is read by the reader, and
wherein the specific color information is color information extracted from the fifth image data.

6. The apparatus according to claim 1,
wherein, when color information extracted from the first image data is color information that does not coincide with any specific color information, the processor is configured to extract the color information that does not coincide with any specific color information as color information that is the same as specific color information that is the most similar to the color information that does not coincide with any specific color information.

7. The apparatus according to claim 1, wherein the specific color information comprises information regarding different colors.

8. The apparatus according to claim 7, wherein the specific color information comprises one of a color number or a color name.

9. The apparatus according to claim 1, wherein the line comprises a hand drawn line.

10. The apparatus according to claim 1, wherein
the processor is configured to form a rectangle around the second image data and the line; and
the processor is configured to remove the line within the rectangle.

11. The apparatus according to claim 1, wherein
the processor is configured to form rectangles around different regions of second image data and respective lines, and to combine the rectangles with different regions therein such that some of the vertices of the rectangles coincide, and image data within the rectangles is combined.

12. An image processing method comprising:
reading an image on a sheet;
acquiring first image data from the image read;

extracting color information from the first image data;

extracting second image data surrounded by a line with specific color information in the first image data acquired from a first image area on a first sheet which is read, the first image area on the first sheet designated by at least one first marking in a specific color;

generating third image data based on the second image data, the third image data corresponding to a second image area designated by at least one second marking in the same specific color as the at least one first marking; and printing a second image based on the third image data on a region of a sheet corresponding to the second image area.

13. The method according to claim 12, wherein the third image data is generated based on the second image data and layout position information.

14. The method according to claim 13, further comprising:

acquiring fourth image data from an image on a second sheet which is read, and wherein the layout position information is position information of a region surrounded by a line with the specific color information in the fourth image data.

15. The method according to claim 12, further comprising:

acquiring fifth image data from an image on a third sheet which is read, and wherein the specific color information is color information extracted from the fifth image data.

16. The method according to claim 12, further comprising:

acquiring sixth image data from an image on a fourth sheet which is read, wherein the specific color information is color information extracted from the sixth image data, and wherein the layout position information is position information of a region surrounded by a line with the specific color information in the sixth image data.

17. The method according to claim 12, further comprising:

when color information extracted from the first image data is color information that does not coincide with any specific color information, extracting the color information that does not coincide with any specific color information as color information that is the same as specific color information that is the most similar to the color information that does not coincide with any specific color information.

* * * * *